Figure 1:
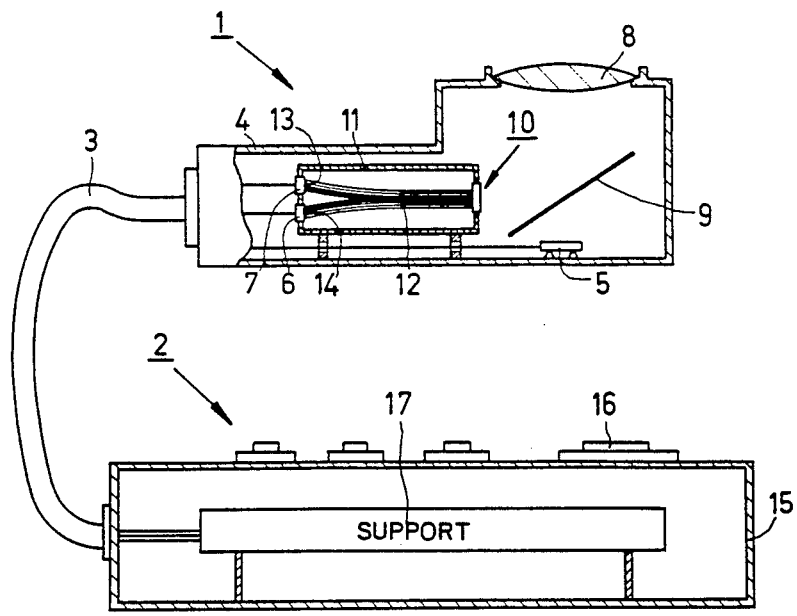

United States Patent [19]

Maassen et al.

[11] Patent Number: 4,632,558
[45] Date of Patent: Dec. 30, 1986

[54] COLOR ANALYZER

[75] Inventors: Egbertus J. P. Maassen; Franciscus A. M. M. van Meel, both of Eindhoven, Netherlands

[73] Assignee: U.S. Philips Corporation, New York, N.Y.

[21] Appl. No.: 595,778

[22] Filed: Apr. 2, 1984

[30] Foreign Application Priority Data

Apr. 6, 1983 [NL] Netherlands .......................... 8301198

[51] Int. Cl.$^4$ .......................... G01J 1/00; G03B 27/80
[52] U.S. Cl. ......................................... 356/404; 355/38
[58] Field of Search ...................... 355/35, 38; 356/404

[56] References Cited

U.S. PATENT DOCUMENTS

| 3,418,048 | 12/1968 | Veit | 355/38 |
| 3,797,933 | 3/1974 | Sable | 355/35 |
| 3,819,373 | 6/1974 | Sable | 355/35 |
| 4,176,946 | 12/1979 | Takahashi | 356/404 |
| 4,236,818 | 12/1980 | Fauchier, II | 355/38 |
| 4,353,641 | 10/1982 | Merlo | 355/38 |
| 4,494,876 | 1/1985 | Van Wandelen | 356/404 |

OTHER PUBLICATIONS

Sribnick, *Popular Photography*, V. 82, No. 3, Mar., 1978, pp. 117–119, 152.

Primary Examiner—F. L. Evans
Assistant Examiner—Joel L. Harringa
Attorney, Agent, or Firm—Paul R. Miller

[57] ABSTRACT

A color analyzer for determining the exposure time required for printing color photographs by an enlarger comprising a measuring unit having three photoelectric cells. The analyzer is further provided with a control unit being electrically connected to the measuring unit and having an electric circuit for determining the exposure time. According to the present invention, the characteristic values of the color components, blue, green and red are measured by a respective photoelectric cell for a test print as electric signals generated by the cells at voltages of $S_{BO}$, $S_{GO}$, and $S_{RO}$ at the associated exposure time $t_o$. These values are stored in a memory and the exposure time t of an arbitrary picture is determined with the aid of measured signals $S_B$, $S_G$ and $S_R$ for the components blue, green, and red. This determination is computed by way of the formula:

$$t = 3t_o/[(S_B/S_{BO}) + (S_G/S_{GO}) + (S_R/S_{RO})].$$

5 Claims, 3 Drawing Figures

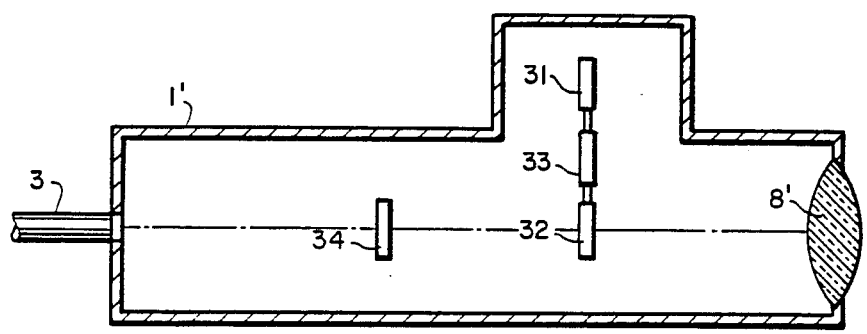
FIG.IA

COLOR ANALYZER

The invention relates to a color analyser for determining the exposure time required for printing color negatives by means of an enlarger, which analyser comprises a measuring unit in which at least one photo-electric cell is disposed with the analyser further being provided with a control unit electrically connected to the measuring unit and which accommodates an electric circuit for determining the exposure time by means of a light quantity measured by the cell in the measuring unit, whereby the characteristic values of the color components blue, green and red for a test print measured by the photoelectric cell in the measuring unit as electric signals $S_{BO} S_{GO}$ and $S_{RO}$ generated by the cell as well as the exposure time $t_o$ adjusted by means of a time indicator device on the control unit and associated with this test print, can be stored in a memory. Such an analyser is known from British Patent Specification No. 1,117,823.

The term "test print" is to be understood herein to mean a print of high quality of a color photonegative which is of a correctly exposed picture of a neutral scene, that is to say a picture of a scene in which none of the colors is predominant, whereby a mixing of the colors as present in the scene produces for someone a color sensation similar to that in a grey-body radiator (see Vocabulaire International de l'éclairage, Publication C.I.E. No. 17 (E-1.1), 1970, pages 28 and 53). A color photonegative is a picture of a scene recorded on a film and can alternatively be a slide. The signals generated by the cell are preferably electric currents or voltages.

In the analyser described in the aforementioned Patent Specification, the blue, the green, and the red component of the light transmitted by an arbitrary picture is measured during printing in comparison with the analogous values measured when making the test print; and the required exposure time for the arbitrary picture is determined by determination of the main value of the measured values. By means of this analyser, a print of high quality can be obtained of a correctly exposed picture of a neutral scene. However, it has been found that during printing of a picture of a non-neutral scene (i.e. a scene in which a given color is predominant), whereby the exposure time was determined by means of the known analyser, mostly overexposed prints were obtained. Further, undesired and disturbing color shades were likely to be obtained on such a print. With a shade of a given color, it seems as if all the colors occurring in a print are mixed with the same quantity of this color.

The invention has for its object to provide a color analyser which determines the exposure time required for printing a colour photograph of an arbitrary scene in such a manner that the aforementioned disturbing phenomena are at least mitigated.

According to the invention, a color analyser of the kind mentioned in the opening paragraph is therefore characterized in that the electric signals $S_B$, $S_G$ and $S_R$ of the color components blue, green, and red, respectively, of the light originating from an arbitrary color photograph arranged in the enlarger, which signals are generated by the respective photoelectric cells the time indicator device on which the exposure time $t$ required for printing the arbitrary photograph is controlled by the electric circuit, where:

$$t = 3t_o/[(S_B/S_{BO}) + (S_A/S_{AO}) + (S_R/S_{RO})].$$

In the analyser according to the invention, after it has been programmed for a test print and after the contributions of the various color components have been measured for an arbitrary picture, the exposure time $t$ is determined in such a manner that a correctly exposed print is obtained without disturbing color shade. This especially applies for printing color photographs of a scene in which one or more primary colors are absent.

The electric signal (for example, an electric current or voltage) associated with each blue, green, or red component is generated according to one embodiment by only one photoelectric cell, whereby for measuring each signal a color filter (blue, green or red) can be arranged in front of the cell in the light beam originating from the enlarger. In a preferred embodiment the measuring unit of the analyzer according to the invention include three photoelectric cells which are sensitive to blue, green, and red light, respectively. The advantage is that the light quantities of each characteristic color (blue, green, red) can be measured simultaneously. An additional memory for storing this data is then not required in the analyser.

In another embodiment, the light collected by the measuring unit is connected to a photoelectric cell by means of one or more light conductors which are located in the measuring unit. Such light conductors are, for example, in the form of fibers of glass or of synthetic material. Thus, the illumination intensity on the photoelectric cell has a value such that the signal generated by the cell has an acceptable signal-to-noise ratio.

In a practical embodiment of the color analyser, the measuring unit is provided with a mirror which is transparent to blue light which is directed to a first photoelectric cell with the mirror reflecting green and red light towards a window in the wall of a box present in the measuring unit through ends of light conductors located in the box merging into this window, while the other ends of a group of the light conductors merge into another window in another wall of the box in which is arranged a second photoelectric cell sensitive to red light, and the ends of the remaining light conductors merging into a further window in another wall of the box in which is arranged a third photoelectric cell sensitive to green light. Further, a filter is arranged in front of each of the two lastmentioned cells. It is achieved with this embodiment that the signals generated by the cells are as representative as possible of the color composition of the photograph.

An embodiment of the analyser according to the invention will be described more fully with reference to the drawing.

Figure 2:
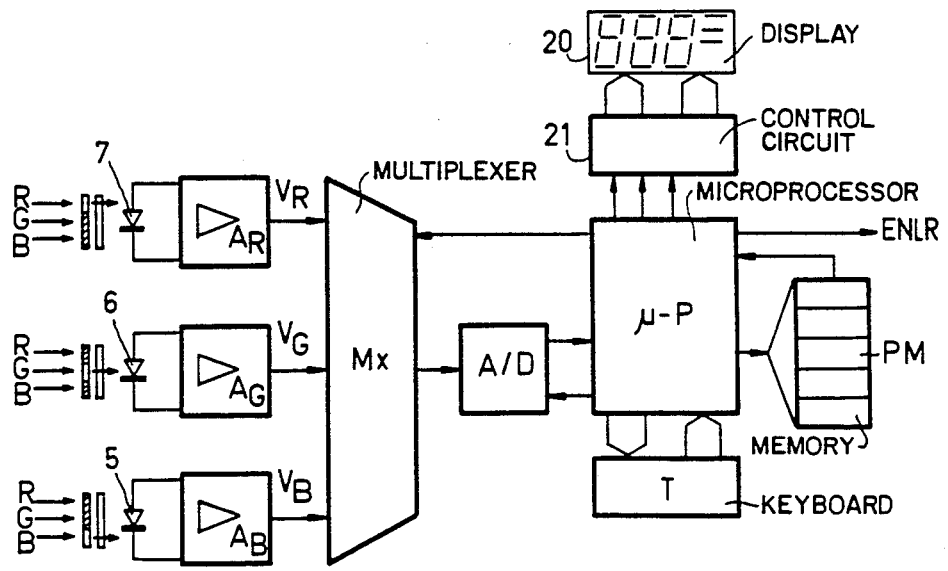

In the drawing:

FIG. 1 shows diagrammatically and in sectional view a color analyser according to the invention, FIG. 1A shows an alternative arrangement of the invention, and FIG. 2 shows a block circuit diagram of the electric circuit in the control unit by means of which the exposure time of an arbitrary color photograph is determined.

The analyser shown in FIG. 1 comprises a measuring unit 1 and a control unit 2 which are electrically connected to each other through a cable 3. During printing, the measuring unit is arranged, for example, on the base plate of an enlarger on which a positive is present during printing. The measuring unit comprises a housing 4 in which are accommodated three photoelectric cells 5, 6 and 7. Further, there is provided in the wall of the housing 4 on the upper side a lens 8 which during operation is located in front of the cell 5 in the light beam originating from the enlarger. Between the photoelectric cell 5 and the lens 8 there is arranged a semi-transparent dichrotic mirror 9 which is at an angle of approximatey 45° to the optical main axis of the lens 8. By means of the lens 8, an image of a diffusor (not shown in the drawing) arranged below the objective of an enlarger is produced on the cell 5. In an alternative embodiment, the lens is replaced by a light-conducting rod which extends a certain distance from the mirror 9. The analyser can then be utilized for a spot measurement in which case the use of a diffusor is superfluous. The mirror 9 transmits light of a wavelength between 400 and 500 nm (blue) towards the cell 5. The remaining (visible) light is reflected in such a manner that it is imaged on a window 10 which is located in the wall of a metal box 11. A plurality of light-conducting fibers 12 of glass or synthetic material located in the box merge into the window 10 of the box 11, while the other ends of these fibers extend partly to an exit window 13 and partly to a window 14 in the wall in which the photoelectric cells 6 and 7 are arranged. In the exit window 13 is arranged a filter which only transmits light of a wavelength of more than 600 nm (red light). At the cell 6 is arranged a filter which transmits light of a wavelength lying between 500 and 600 nm (green light). The control unit 2 connected to the measuring unit comprises a housing 15 of synthetic material in which a support 17 (shown schematically) with an electric circuit is accommodated, by means of which the exposure time is determined with the aid of the characteristic values for the color components blue, green, and red measured by the three photoelectric cells 5, 6 and 7 respectively. These values are electric signals generated by the cells, such as electric voltages (see block circuit diagram of FIG. 2).

FIG. 1A illustrates an alternative embodiment to the present invention in which a single photoelectric cell 34 is provided on the optical axis of the lens 8', and one of three color filters 32 is placed in front of the photoelectric cell. The other color filters 31 and 33 are mounted to be alternatively arranged between lens 8' and photoelectric cell 34.

When determining the exposure time for an arbitrary color photograph, the procedure is as follows. First a so-called test print is made. For this purpose a color photograph (for example, a negative of a colour photograph), i.e. a correctly exposed picture of a neutral scene, is arranged in the enlarger. The scene does not comprise a predominant color, while the scene is illuminated with light having a color temperature and spectral distribution adapted to the film. In making the test print, other factors, such as the enlarger type, the quality of the film, the paper and the chemical and further the individual (subjective) feelings of the user, also play a part. The adjustment of the enlarger is characterized by an exposure time $t_o$ and a combination of quantities of light of the colors blue, green and red, such as emanating from the enlarger in the case of the test print. These quantities are represented by the generated signals $S_{BO}$ (for the blue component), $S_{GO}$ (green) and $S_{RO}$ (red). The exposure time $t_o$ is indicated by means of a time indicator device which is located in the control unit and can be operated by means of a button 16 on a keyboard present on the control unit. These data are stored in a memory. Subsequently, a print is made of an arbitrary negative. For determining the exposure time required, the signals $S_B$, $S_G$ and $S_R$ are determined in the light originating from the enlarger by means of the photoelectric cells. By means of these measured quantities, together with the values $t_o$, $S_{RO}$, $S_{GO}$ and $S_{BO}$ stored in the memory, the required exposure time t is determined by the electric circuit as:

$$t = 3t_o/[(S_B/S_{BO}) + (S_G/S_{GO}) + (S_R/S_{RO})]$$

The signals generated by the cell are amplified, preferably to voltage signals, by the electric circuit in the control unit. Then $S_i = V_i$ (i = BO, GO, RO, B, G, R). The signals (for the colours blue, green, and red) can be read on indicators on the keyboard of the control unit.

In the block circuit diagram of FIG. 2, the photoelectric cells are designated diagrammatically by 5 (blue), 6 (green), and 7 (red). In front of the cells is arranged the separation system for the aforementioned wavelength ranges (shown diagrammatically). A cell produces an electric current if light is incident upon this cell. The electric current originating from each cell is amplified by means of amplifiers $A_B$, $A_G$ and $A_R$ and is transformed into an electric voltage $V_B$, $V_G$ and $V_R$. Those voltages are then converted into a digital signal by means of a multiplexer Mx and an analogue-to-digital converter (A/D). By means of a microprocessor $\mu P$ (which is connected to the keyboard T) and the calibration data (corresponding to $V_{BO}$, $V_{GO}$, $V_{RO}$, and $t_o$) obtained with the test print and stored in the memory PM, the exposure time t required for the arbitrary print is calculated with the aid of the aforementioned formula. The three signals $V_B$, $V_G$ and $V_R$ may in an alternative embodiment also be processed according to the formula to an exposure time t in analogue form. The calculated value of t is then indicated by means of the control circuit 21 on the display device 20 (time indicator device). The control unit further comprises means for coupling with an enlarger. This is indicated in the circuit diagram by an arrow ENLR.

What is claimed is:

1. In a color analyzer for determining exposure time required for printing color photo negatives by an enlarger, said analyzer comprising a measuring unit including at least one photoelectric cell for measuring characteristic values of blue, green, and red measured for a test print as electrical signals $S_{BO}$, $S_{GO}$, and $S_{RO}$, said measuring unit receiving light signals from the enlarger, a control unit electrically connected to said at least one photoelectric cell in said measuring unit, said control unit including electrical circuit means for determining exposure time t relative to a quantity of light measured by said at least one photoelectric cell, said electrical circuit means including a time indicating device, and said control unit including memory means for storing at least said electrical signals, the improvement comprising said at least one photoelectric cell generating electric signals $S_B$, $S_G$, and $S_R$ representative of color components blue, green, and red for a color photo negative in said enlarger, and said electrical circuit means of said control unit controlling said exposure time t to a value $$t = 3t_o/[(S_B/S_{BO}) + (S_G/S_{GO}) + (S_R/S_{RO})]$$

where $t_o$ is the exposure time for said test print.

2. A color analyzer according to claim 1, wherein said measuring unit includes one photoelectric cell and three color filters alternatively arranged between said enlarger and said one photoelectric cell.

3. A color analyzer according to claim 1, wherein said measuring unit includes three photoelectric cells sensitive to blue, green, and red light, respectively, for simultaneously measuring each characteristic color.

4. A color analyzer according to claim 3, wherein a lens is located at said measuring unit between said enlarger and said three photoelectric cells, and wherein light is conducted from said lens to each of said three photoelectric cells.

5. A color analyzer according to claim 4, wherein a mirror transparent to blue light is provided between said lens and a first of said three photoelectric cells, said mirror reflecting green and red light to a box member in said measuring unit, said box member having an entrance window receiving said green and red light, wherein said box member includes a group of light conductors having ends merging into said entrance window, wherein a portion of said group of light conductors extends to a first exit window of said box member, a second of said three photoelectric cells sensitive to red light being disposed after said first exit window, and wherein another portion of said group of light conductors extends to a second exit window of said box member, a third of said three photoelectric cells sensitive to green light being disposed after said second exit window.

* * * * *